United States Patent
Okamoto

(10) Patent No.: US 9,451,106 B2
(45) Date of Patent: Sep. 20, 2016

(54) ELECTRONIC APPARATUS THAT CHANGES OPERATION MESSAGES, CONTROLLING METHOD OF ELECTRONIC APPARATUS, AND RECORDING MEDIUM

(71) Applicant: KYOCERA Document Solutions Inc., Osaka (JP)

(72) Inventor: Hironori Okamoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 14/634,775

(22) Filed: Feb. 28, 2015

(65) Prior Publication Data
US 2015/0249760 A1    Sep. 3, 2015

(30) Foreign Application Priority Data
Feb. 28, 2014 (JP) ................................ 2014-038574

(51) Int. Cl.
*G06F 15/00* (2006.01)
*H04N 1/00* (2006.01)

(52) U.S. Cl.
CPC ........ *H04N 1/00498* (2013.01); *H04N 1/0097* (2013.01); *H04N 1/00408* (2013.01); *H04N 1/00514* (2013.01); *H04N 2201/0094* (2013.01)

(58) Field of Classification Search
CPC .......... H04N 1/00408; H04N 1/0097; H04N 2201/0094
USPC ...................................................... 358/1.14
See application file for complete search history.

(56) References Cited

U.S. PATENT DOCUMENTS

2008/0168380 A1*  7/2008  Kodimer ............... G06F 9/4443
715/779

FOREIGN PATENT DOCUMENTS

JP         2004-030019 A      1/2004

* cited by examiner

*Primary Examiner* — Saeid Ebrahimi Dehkordy
(74) *Attorney, Agent, or Firm* — Hawaii Patent Services; Nathaniel K. Fedde; Kenton N. Fedde

(57) ABSTRACT

Provided is an electronic apparatus, when there is a request of modification of a message, or the like, which are shown on a display for indication from a user, it remakes the operation program that includes a message part at the site in which the MFP or the like are installed, and a check of the validity of the message part to be changed is possible. A display shows first information. A memory part writes the first information, second information and operation program for changing a part or all of the first information, and a source code for a basis of the operation program. By a control apparatus, the second information is determined to be appropriate. A control circuit is accepted in this case and generates an operation program based on the source code, the first information, and the second information.

12 Claims, 13 Drawing Sheets

| | 72: MEMORY PART | | | | | | |
|---|---|---|---|---|---|---|---|
| ADDRESS (AREA) | DATA (CONTENTS) | | | | | | |
| FIXED AREA | PROGRAM SOURCE AREA | | | | | | |
| | MESSAGE STORING AREA | [CODE] | [CONTENTS OF PROCESS] | [LANGUAGE 1] | [LANGUAGE 2] | [LANGUAGE 3] | ... |
| | | 1 | COPY | Kopi | Copy | Ψοπy | ... |
| | | 2 | FACSIMILE TRANSMISSION AND RECEPTION | Fakkusu | FAX | ΦΑΧ | ... |
| | | 3 | MANUSCRIPT READING | Skyan | Scan | Σψαν | ... |
| | | 4 | IMAGE DATA TRANSMISSION | Soushin | Send | Σενδ | ... |
| | | ⋮ | ⋮ | ⋮ | ⋮ | ⋮ | ⋮ |
| | [LANGUAGE SETUP] (LANGUAGE X) | | | | | | |
| NON-VOLATILE AREA | FIRMWARE (EXECUTABLE FILE OF CONTROL PROGRAM) AREA | | | | | | |
| | MESSAGE INPUT AREA | [CODE] | [MESSAGE] | | | | |
| | | 1 | MESSAGE 1 | | | | |
| | | 2 | MESSAGE 2 | | | | |
| | | 3 | MESSAGE 3 | | | | |
| | | 4 | MESSAGE 4 | | | | |
| | | ⋮ | ⋮ | | | | |
| | VARIOUS SETUP INFORMATION AREA | | | | | | |
| | ⋮ | | | | | | |
| VOLATILE AREA | IMAGE DATA AREA | | | | | | |
| | ⋮ | | | | | | |

FIG.3A

| ADDRESS (AREA) | 101: FLASH MEMORY | |
|---|---|---|
| | DATA (CONTENTS) | |
| | [CODE] | [MESSAGE] |
| x000 | 1 | MESSAGE A |
| x001 | 2 | MESSAGE B |
| x002 | 3 | MESSAGE C |
| x003 | 4 | MESSAGE D |
| ... | ... | ... |

FIG. 3B

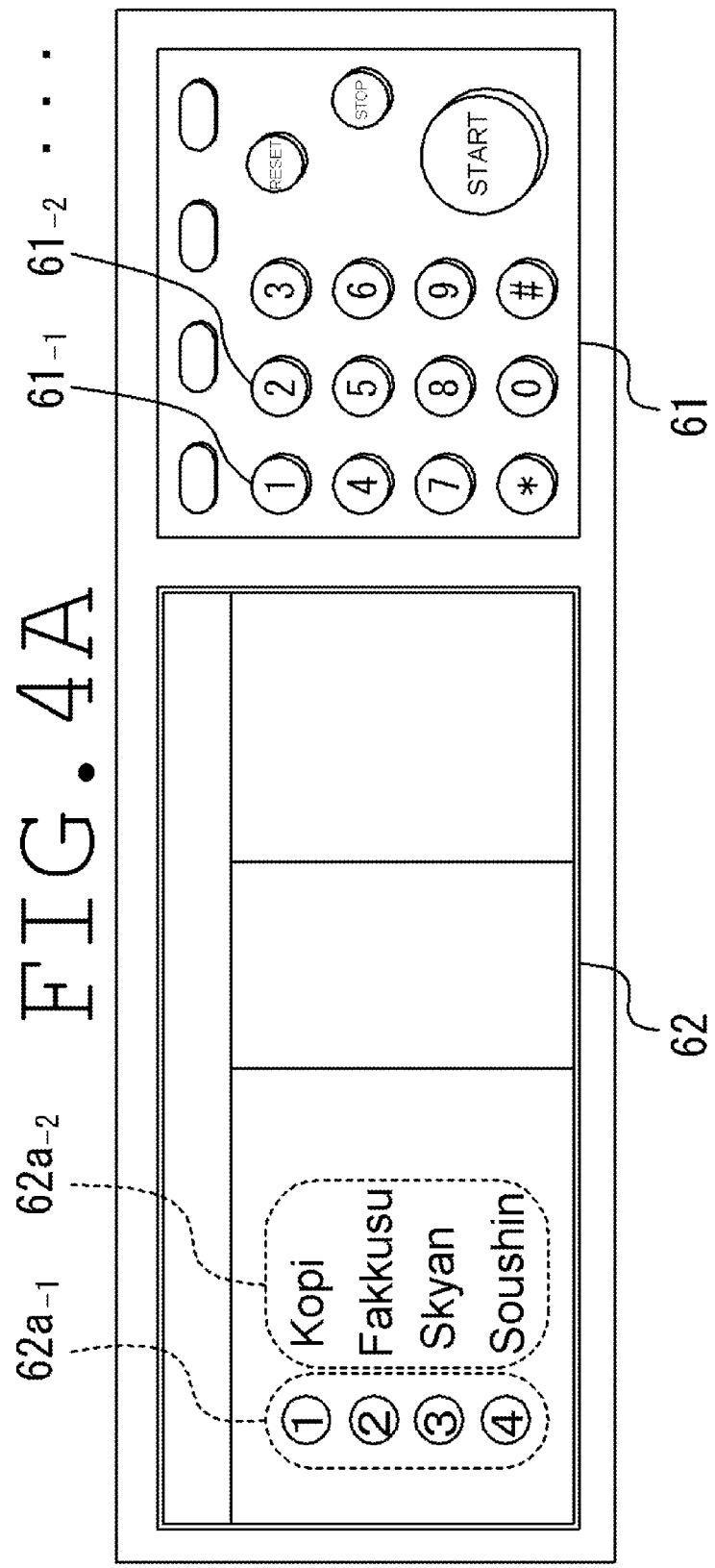

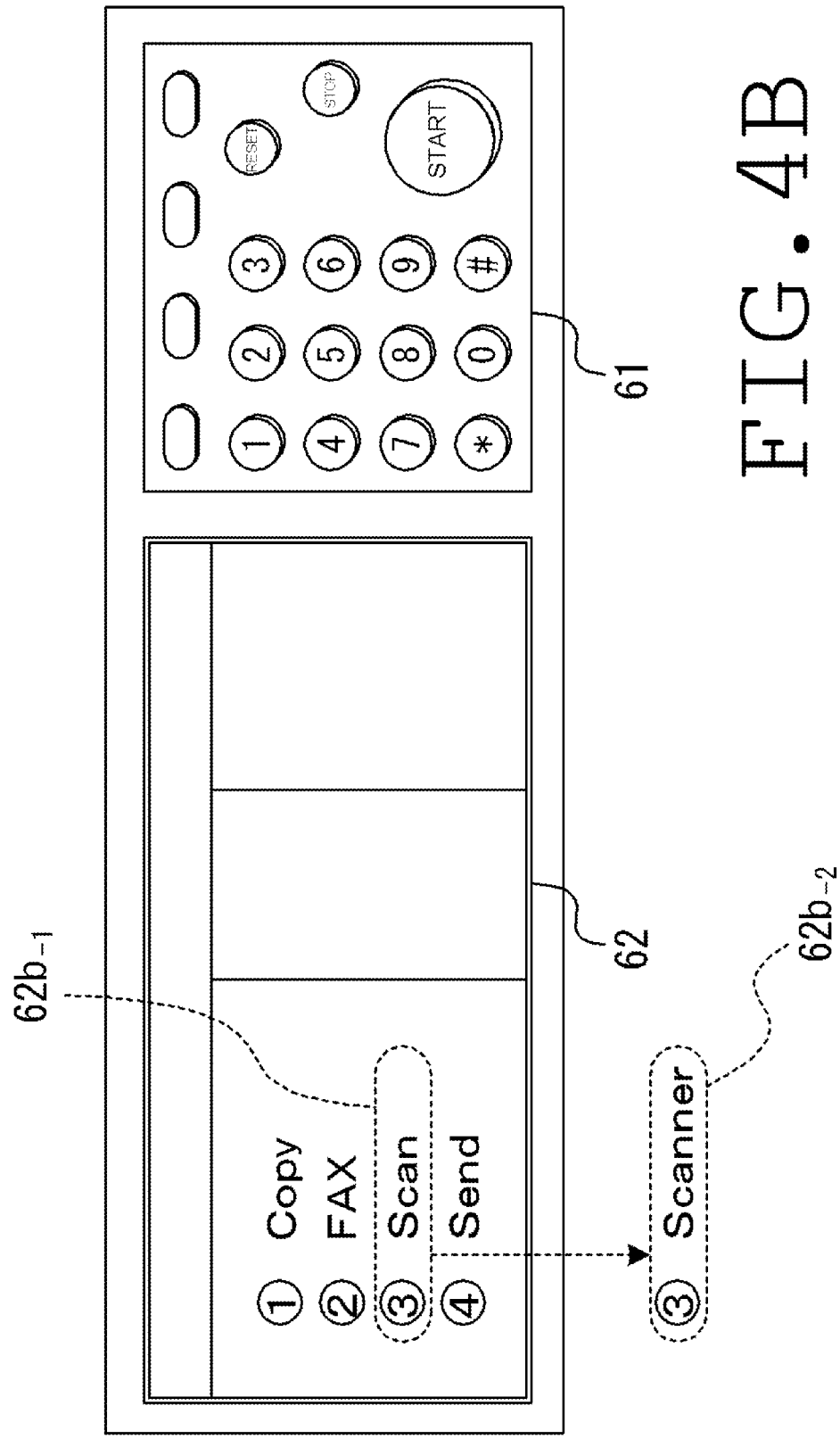

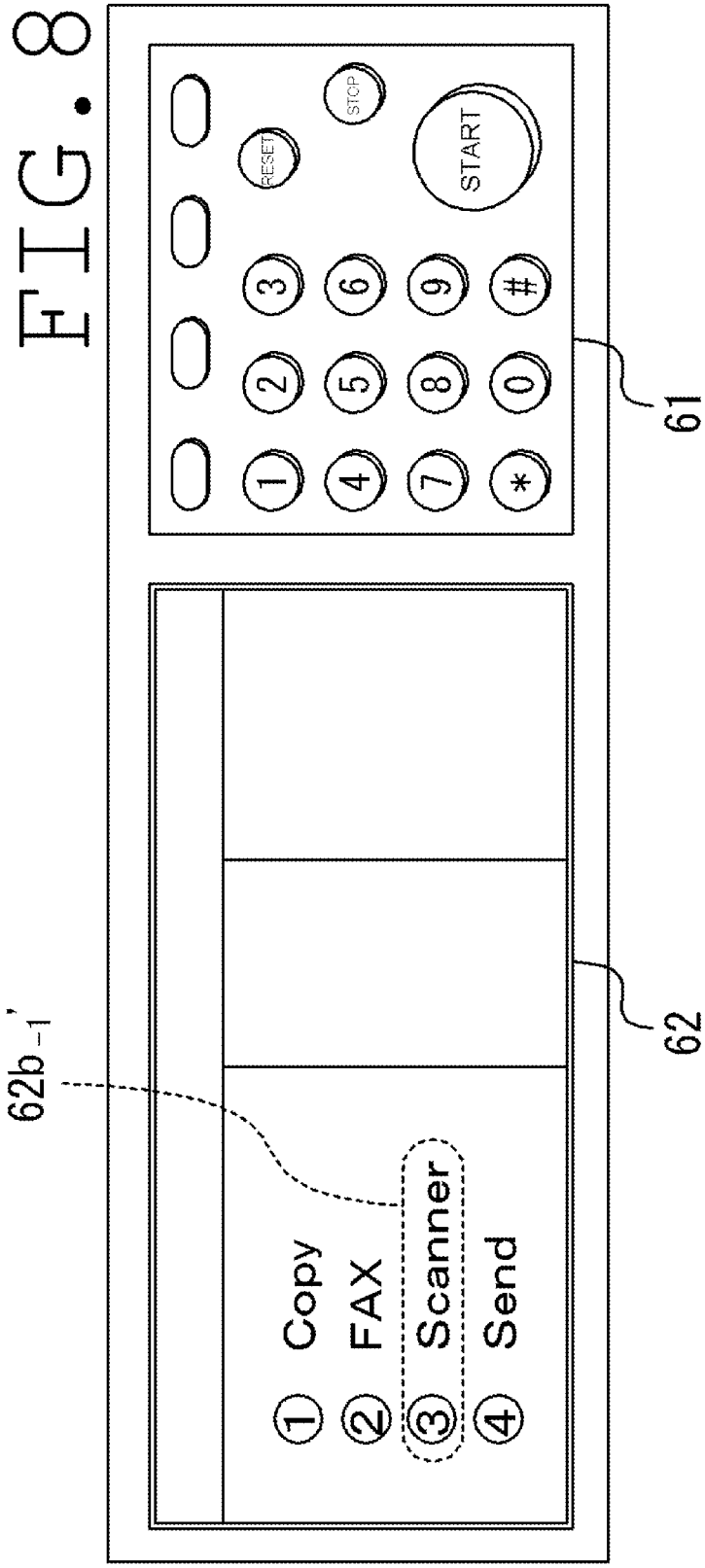

101 101: FLASH MEMORY

| ADDRESS (AREA) | DATA (CONTENTS) | |
|---|---|---|
| | [CODE] | [MESSAGE] |
| x000 | 1 | --- |
| x001 | 2 | --- |
| x002 | 3 | --- |
| x003 | 4 | Okuru |
| ... | ... | ... |

FIG. 9B

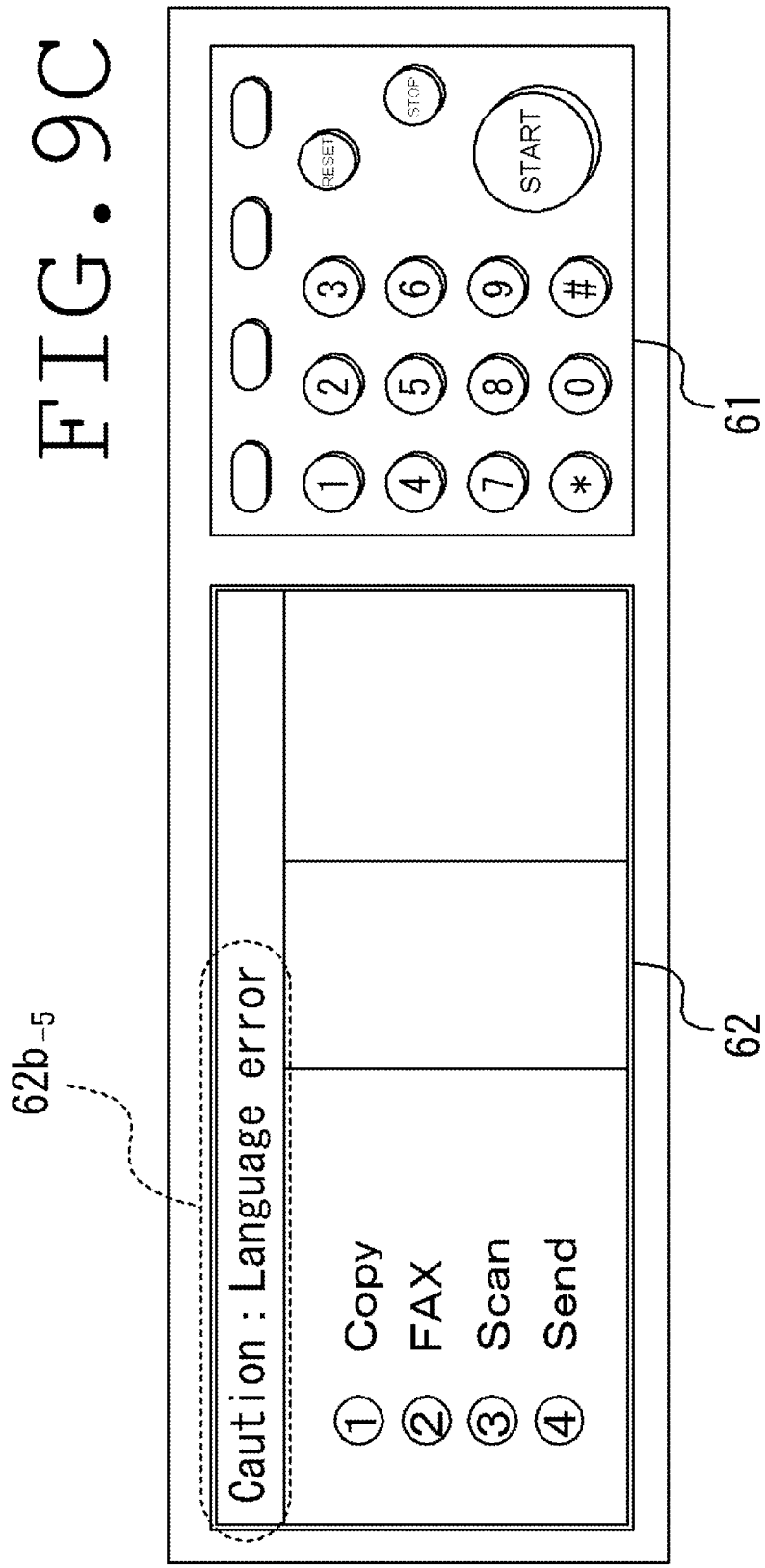

ELECTRONIC APPARATUS THAT CHANGES OPERATION MESSAGES, CONTROLLING METHOD OF ELECTRONIC APPARATUS, AND RECORDING MEDIUM

INCORPORATION BY REFERENCE

This application is based on and claims the benefit of priority from Japanese Patent Application No. 2014-038574 filed on Feb. 28, 2014, the contents of which are hereby incorporated by reference.

BACKGROUND

The present disclosure is related with the controlling method of electronic apparatus and electronic apparatus, which has the display that shows operation messages, or the like, and a control program that controls operation messages, and is able to rewrite the control program including the operation messages in order to change operation messages.

An MFP is an apparatus that has a printer function, a scanner function, and a communication function and is used as a FAX machine or a copying machine other than the printer. Many of MFPs are used as peripheral equipment in a computer. In addition, the MFP has an operation panel that has a liquid crystal display, or the like because of taking into consideration for stand-alone-use.

Also, in some MFP, the message shown on the above-mentioned liquid crystal display, or the like, may be selectable from various languages by a control unit of the liquid crystal display, or the like. This is considered for being used in many areas.

There are various problems to be embedded message in a lot of languages previously into a control unit. Therefore, there are some examples that after writing a program of the control unit (firmware,) updating and using a part of the message.

However, in many cases, the program of the control unit becomes large-scale or complicated. Also, sometimes, requires a long time in case of rewriting. Consequently, it is also proposed a technique of rewriting such the program of the control unit, efficiently.

SUMMARY

The electronic apparatus of the present disclosure has a display, a memory part, a control circuit, and a communication interface. The display shows first information. The memory part writes the first information, second information and operation program for changing a part or all of the first information, and a source code for a basis of the operation program. The control circuit performs a process based on the operation program. The communication interface connects with a communications network to which a control apparatus is connected. The control circuit transmits the second information written in the memory part to the control apparatus. The control circuit generates, only in cases where the second information is determined to be appropriate by the control apparatus, the operation program based on the source code, the first information, and the second information.

A controlling method of the electronic apparatus of the present disclosure is performed by the electronic apparatus possessing a display, a memory part, a control circuit, and a communication interface. The display shows the first information. The memory part writes the first information, second information and operation program for changing a part or all of the first information, and a source code for a basis of the operation program. The control circuit performs a process based on the operation program. The communication interface connects with a communications network to which a control apparatus is connected. In a first step, the control circuit transmits the second information written in the memory part to the control apparatus by the control circuit. In a second step, the control apparatus determines whether the second information is appropriate. In a third step, the control apparatus generates the operation program based on the source code, the first information, and the second information, in a case where the second information is determined to be appropriate by the control apparatus.

A non-transitory recording medium stores a program that performs a controlling method of an electronic apparatus executed by the electronic apparatus. The electronic apparatus has a display, a memory part, a control circuit, and a communication interface. The display shows first information. The memory part writes the first information, second information and operation program for changing a part or all of the first information, and a source code for a basis of the operation program. The control circuit executes a process based on the operation program. The communication interface that connects with a communications network to which a control apparatus is connected. The program has the first step, the second step, and the third step. In the first step, the control circuit transmits the second information written in the memory part to the control apparatus. In the second step, the control apparatus determines whether the second information is appropriate. In the third step, control apparatus generates the operation program based on the source code, the first information, and the second information, in a case where the second information is determined to be appropriate.

BRIEF DESCRIPTION OF THE DRAWINGS

FIG. 3A is a memory map illustrating an area allocation of memory part 72 in MFP 1;

FIG. 3B is a memory map illustrating an area allocation of flash memory 101 in MFP 1;

FIG. 4A diagram for explaining a selection screen of a process and modification of a message shown on liquid crystal display part 62 in the present embodiment;

FIG. 4B is a diagram for explaining the selection screen of a process and modification of a message shown on liquid crystal display part 62 in the present embodiment;

FIG. 8 is a diagram illustrating an example of indication of liquid crystal display part 62 after the character string of the message is changed;

FIG. 9B is a diagram illustrating the example of the character string written in flash memory 101, in cases where modification of a message that is judged not to be "appropriate" in the present embodiment is required; and FIG. 9C is a diagram illustrating the example of a display of liquid crystal display part 62, in cases where modification of a message that is judged not to be "appropriate" in the present embodiment is required.

DETAILED DESCRIPTION

Then, an embodiment of the present disclosure is described in detail with reference to drawings.

Figure 1:
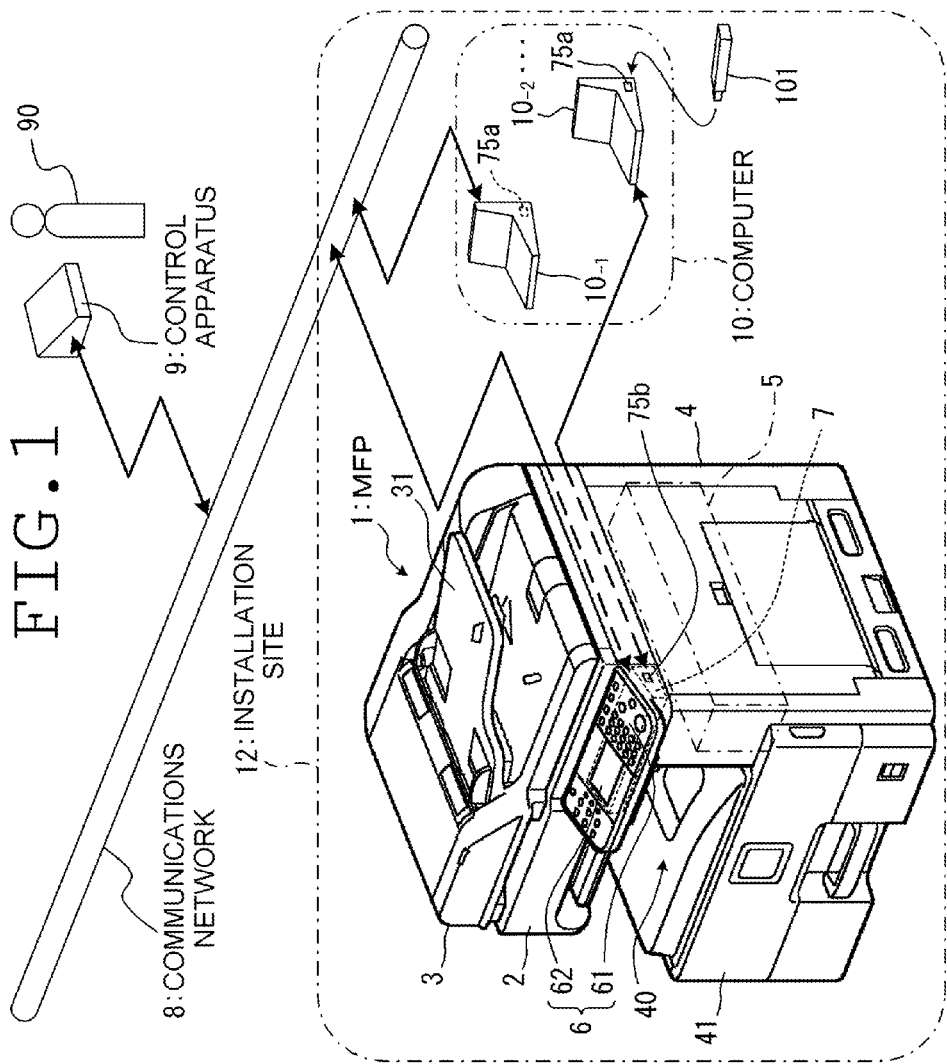
FIG. 1 is a diagram illustrating an appearance configuration of MFP 1, connection relationship with control apparatus 9 and computer 10 in an embodiment of the present disclosure.

The image forming apparatus of the present embodiment is MFP (Multi Function Peripheral) 1, which uses electrophotographing system. MFP 1 is an example of an electronic apparatus in the present embodiment. As refer to FIG. 1 and FIG. 2, MFP 1 includes scanner part 2, ADF (Auto Document Feeder: manuscript reader) 3, body part 4, and operation part 6. Subsequently, in each drawing, identical numbers are given to the identical component.

The ADF 3 is allocated in an upper part of scanner part 2, and scanner part 2 is allocated in the upper part of body part 4. Also, ejection space 40 is formed between scanner part 2 and body part 4. In addition, although the present embodiment explains the example that applies MFP 1, it cannot be overemphasized that a printer, a copying machine, or the like, are included in the image forming apparatus in the present disclosure.

ADF 3 feed outs manuscript (not shown,) which is placed in manuscript mounting part 31, one at a time in order, and it conveys the manuscript to a position that faces on scanner part 2. Scanner part 2 reads an image of a front surface of the conveyed manuscript. In addition, since scanner part 2 and inside of ADF 3 have general configuration, illustration and detailed explanation are omitted in the present embodiment.

Body part 4 has printing part 5 and sheet paper cassette 41. Since the main components of printing part 5 or internal configuration of sheet paper cassette 41 is similar to the typical apparatus, and illustration and detailed explanation are omitted in the present embodiment. Printing part 5 feed outs a recording paper P (not shown) from sheet paper cassette 41, forms an image on front surface of this recording paper with toner, and discharges recording paper P to ejection space 40 with a process of heat fusing, or the like.

Operation part 6 has manual operation button 61 and liquid crystal display part 62. Control part 7 is provided in operation part 6 (lower to manual operation button 61 and liquid crystal display part 62). Control part 7 includes CPU (Central Processing Unit: central processing unit) 71, memory part 72, and communication I/F (Interface: interface) 73, external bus I/F 74 (external interface), or the like. CPU 71 is an illustrative example of the control circuit in the present embodiment.

Memory part 72 includes non-volatile area and volatile area, as illustrated in FIG. 3A. The non-volatile area is non-transitory recording medium. In the non-volatile area, information can be kept without supplying electric power. In the non-volatile area, the fixed area where various information is mainly written at the time of production and factory shipments is included.

In the non-volatile area, a language set area, a firmware area, a message input area as described later, various setup information areas about entire MFP 1, or the like, are included. The firmware area is an area of the control program that controls MFP 1 entirely.

Also, the program source area that stores source of the above-mentioned firmware to control, the message storing area (message area) as described later, or the like, are included in the non-volatile area. However, since they are not rewritten, they are usually provided in the fixed area.

On the other hand, volatile area is also non-transitory recording medium.

In volatile areas, an image data area, or the like, which an image read by scanner part 2 is converted to data and memorize it temporarily, is provided. In addition, the image data may be memorized in the above-mentioned non-volatile area in the long term.

Communication I/F 73 is connected to communications network 8. Communication I/F 73 transmits and receives a facsimile, or transmits and receives information between control apparatus 9 and computer 10-1. Control apparatus 9 and computer 10-1 are connected to communications network 8 as like MFP 1. In addition, an interface for connecting with computer 10-2, for example, without passing communications network 8, is included in the communication I/F 73. Also, since illustration and detailed explanation are not shown, needless to say, a plurality of MFP 1, and MFP 1, which are similar to the configuration in the present embodiment, may be connected to communications network 8.

These computers 10-1, computer 10-2, . . . , is provided as close (or neighborhood) to MFP 1, generally. The computer 10-1 and computer 10-2, . . . , uses MFP 1 as peripheral equipment, and is also used when changing the firmware or a setup of MFP 1. In addition, accordingly, these computers 10-1, computer 10-2, . . . , is only called as computer 10, as required.

Above-mentioned control apparatus 9 is generally provided for an object that management of use condition and regular maintenance for MFP 1, and an emergency or lasting measure process, which is performed with automatic or manual operation, on the occasion of a sudden obstacle.

In addition, control apparatus 9 of the present embodiment has translation function and language translation table for verifying validity and compatibility when changing the message shown on liquid crystal display part 62 of MFP 1. Also, it has input/output function for looking for decision by operator 90, or the like, in cases where control apparatus alone will not enable you to determine validity and compatibility.

Also, according to the present embodiment, computer 10 is installed at installation site 12 of MFP 1 (or the neighborhood.) Control apparatus 9 is installed in the remote place to installation sites 12, such as a factory and a sales base (both of them are not shown).

These computers 10 includes an interface, or the like, for connecting external memory or the like (not shown,) external bus terminal 75a for connecting flash memory 101, or the like.

As illustrated in FIG. 3B, in flash memory 101, a code and a message (described later) can be written in each address x000, x001, . . . . Flash memory 101 is an illustrative example of the external storage of the present embodiment.

For external bus I/F 74 provided in MFP 1, similar interface as computer 10 is also used. External bus terminal 75b for connecting external apparatus is provided in the external bus I/F 74. External bus terminal 75b is provided in a side of operation part 6, or the like.

Figure 2:
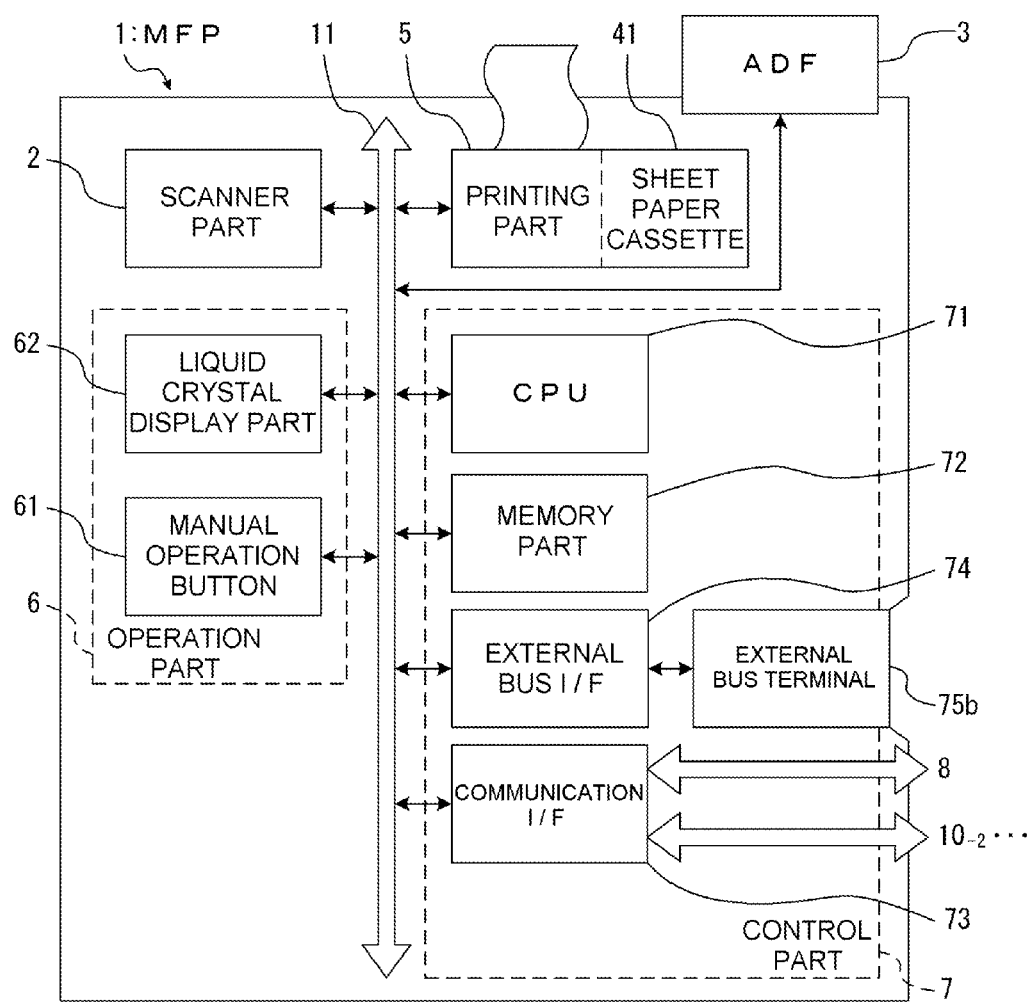
FIG. 2 is a block diagram illustrating a circuit configuration of MFP 1 in the present embodiment.

Each part of MFP 1 is connected to bus 11 as illustrated in FIG. 2. CPU 71 performs various processes based on the control program (firmware) memorized in memory part 72.

As illustrated in FIG. 4A, for MFP 1 in such a configuration, when waiting for instructions of the next process, a selection screen of the next process is shown on liquid crystal display part 62. In this case, a user of MFP 1, for example, depresses button 61-1 for copying a manuscript and depresses button 61-2 for transmitting a manuscript by FAX. Thus, manual operation button 61 is operated such way, and number corresponding to the desired process is chosen (If liquid crystal display part 62 has a touch panel, or the like, it is also possible to operate area 62*a*-1 of liquid crystal display part 6, directly).

The message shown on area 62*a*-1 and area 62*a*-2 in liquid crystal display part 62 in case when waiting for instructions of the next process is stored in the message area of memory part 72 as shown in FIG. 3A. Any of language 1 or language 2, language 3, . . . is selected, for example, the character string for the code number corresponding to the number shown on area 62*a*-1 is displayed on area 62*a*-2.

That is, in the example of FIG. 4A, language 1 is chosen, thus, accordingly, in a position corresponding to "(1)" at area 62*a*-1 in liquid crystal display part 62, (Number 1 with a circle is expressed in this way. Hereinafter, the number with a circle will be shown in the same way,) "Kopi" of code number 1 is displayed on the corresponding position. Similarly, in the position corresponding to "(2)", "Fakkusu" of code number 2 is displayed (similarly applied hereafter).

Here, for example, if language 2 for a specific area is chosen as the message area of memory part 72 as shown in FIG. 3A, a message as illustrated in FIG. 4B is shown on liquid crystal display part 62.

Figure 5:
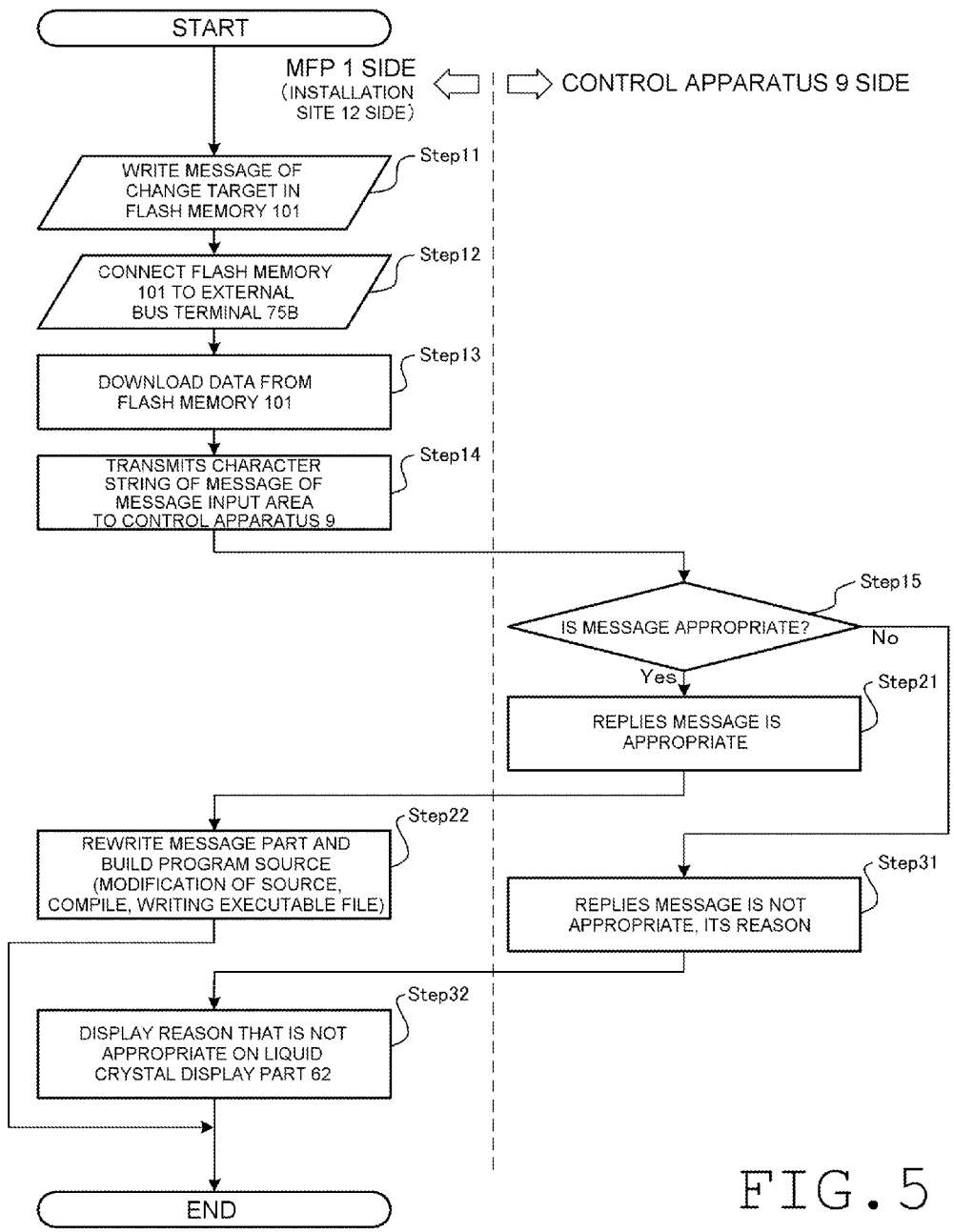
FIG. 5 is a flow chart of a message change process in the present embodiment.

However, by a user, or the like, there is a request of a purport that the notation "Scan" for message 62*b*-1 in "(3)" is not appropriate and thus changes into the notation "Scanner" as like message 62*b*-2. The procedure of the change process in that case is explained in the following with reference to FIG. 5. In addition in FIG. 5, the left from a dashed line indicates a process of MFP 1 (installation site 12), and the right from the dashed line indicates a process of control apparatus 9.

According to the present embodiment, in cases where it changes the message shown on area 62*a*-2 (as refer to FIG. 4A) in liquid crystal display part 62, firstly, a character string of a message to change is written in flash memory 101 by computer 10 (Step 11.)

This operation is carried out by connecting flash memory 101 to external bus terminal 75*a* in computer 10.

Figure 6:
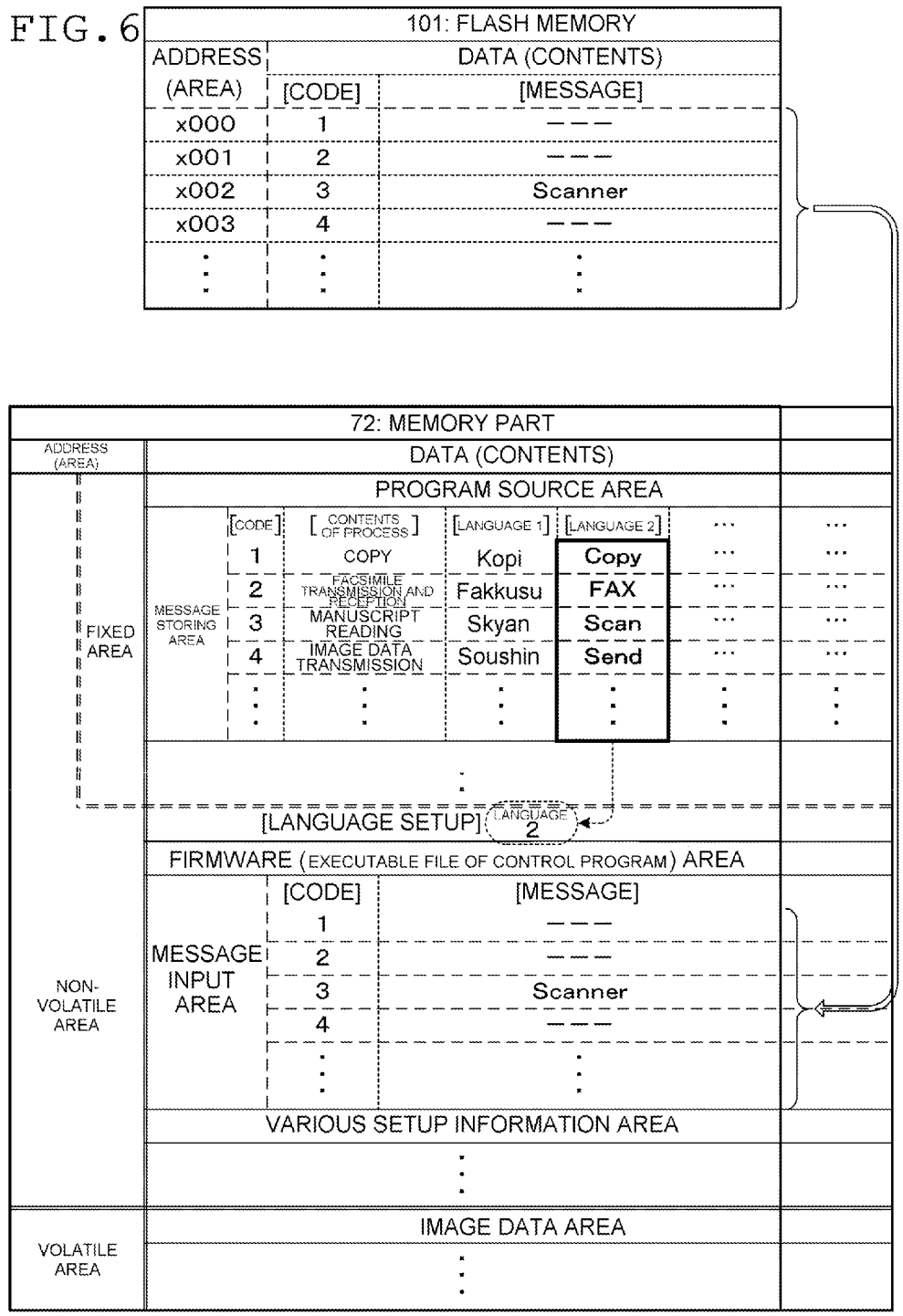
FIG. 6 is a tabular diagram explaining download of data written in flash memory 101.

Here, as shown in FIG. 4B, the notation of the position of message 62*b*-1 of "(3)" is changed into "Scanner." Therefore, as illustrated in the table of flash memory 101 in FIG. 6, the character string "Scanner" is written in the address corresponding to [code] 3 as [message].

Here, about the part (position,) which does not change a message, the address corresponding to it in flash memory 101 is a blank. However, for convenience, to distinguish from a null character, "---" shows a blank column in the present embodiment.

Then, flash memory 101 in which the character string of the message to be changed has been written is connected to external bus terminal 75*b* in MFP 1 (Step 12). When flash memory 101 is connected to external bus terminal 75*b*, CPU 71 downloads the data written in flash memory 101 (Step 13).

In this case, as illustrated in FIG. 6, "download" means reading the character string of the message written in flash memory 101 and writing in the applicable position of the message input area in memory part 72.

Here, CPU 71 transmits the character string of the message downloaded to the message input area of memory part 72 and attached data for it (language setting information, or the like,) to control apparatus 9 via communications network 8 from communication I/F 73 (Step 14).

Control apparatus 9 verifies the validity for the received character string as corresponded to the language (any of language 1, language 2, and language 3, as illustrated in FIG. 3A) chosen in MFP 1, which transmits data. This validity shows a meaning being right, being another languages, being a different content of a process, or the like (Step 15).

Here, control apparatus 9, in cases where it is determined that the character string sent from MFP 1 has validity (it does not become an obstacle even if it changes from the character string of the original message), replies this message is that case of "appropriate" to MFP 1 (Step 21).

Figure 7:
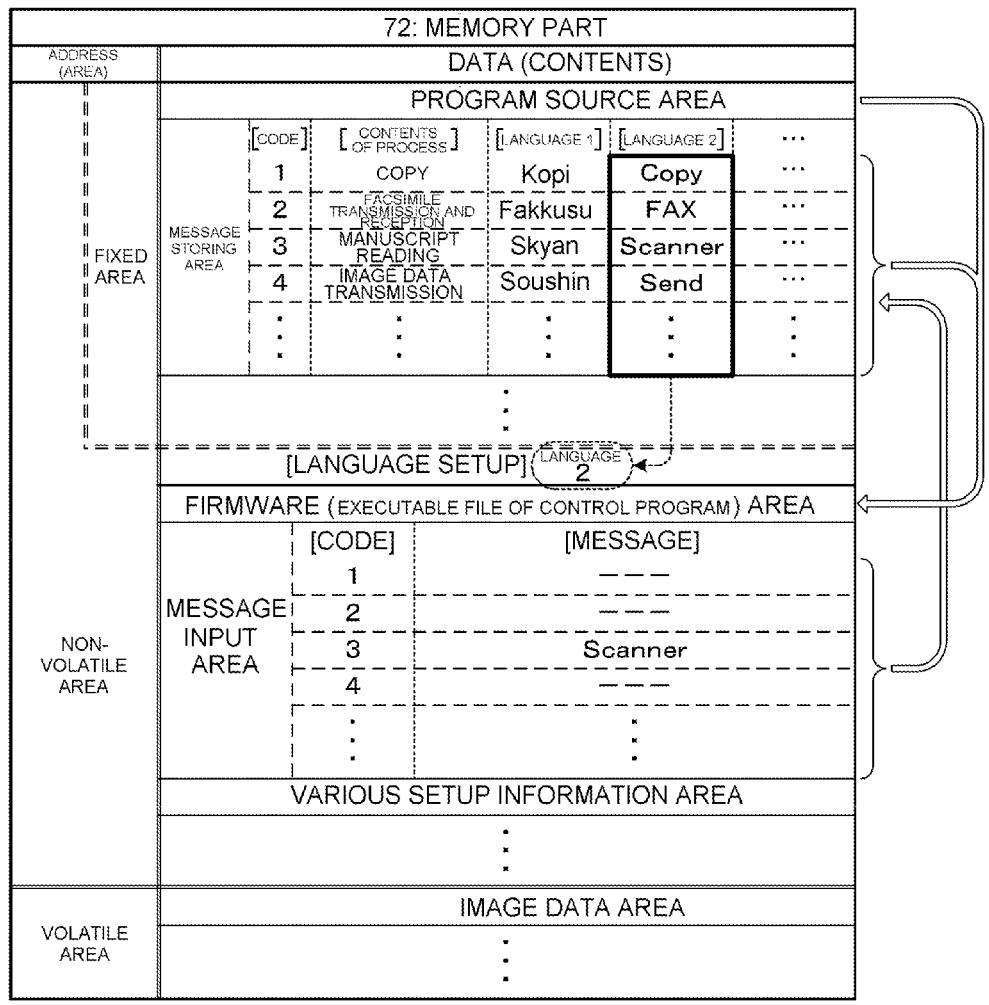
FIG. 7 is a tabular diagram illustrating the relationship between a program source and message character string in memory part 72, and firmware.

CPU 71 receives the reply (a message, such as "appropriate") from control apparatus 9, and it rewrites the section equivalent to a message in the program source currently written in memory part 72 to the character string of the same message input area and builds (Step 22). Namely, in build referred here, as shown in FIG. 7, to the program source currently written in memory part 72, the character string of the message (the example in FIG. 7 is language 2) and the alteration data currently written in the message input area are incorporated and rebuild. Further, the compiled executable file is written in the firmware area. In addition, naturally, the data of the fixed area will not be rewritten.

However, in FIG. 7, for convenience, the character string of the message, which is changed and is taken into firmware is shown.

In this way, when executing the firmware, which is written in memory part 72 again, the display of message 62*b*-1' of liquid crystal display part 62 is changed into "Scanner", as illustrated in FIG. 8.

Figure 9A:
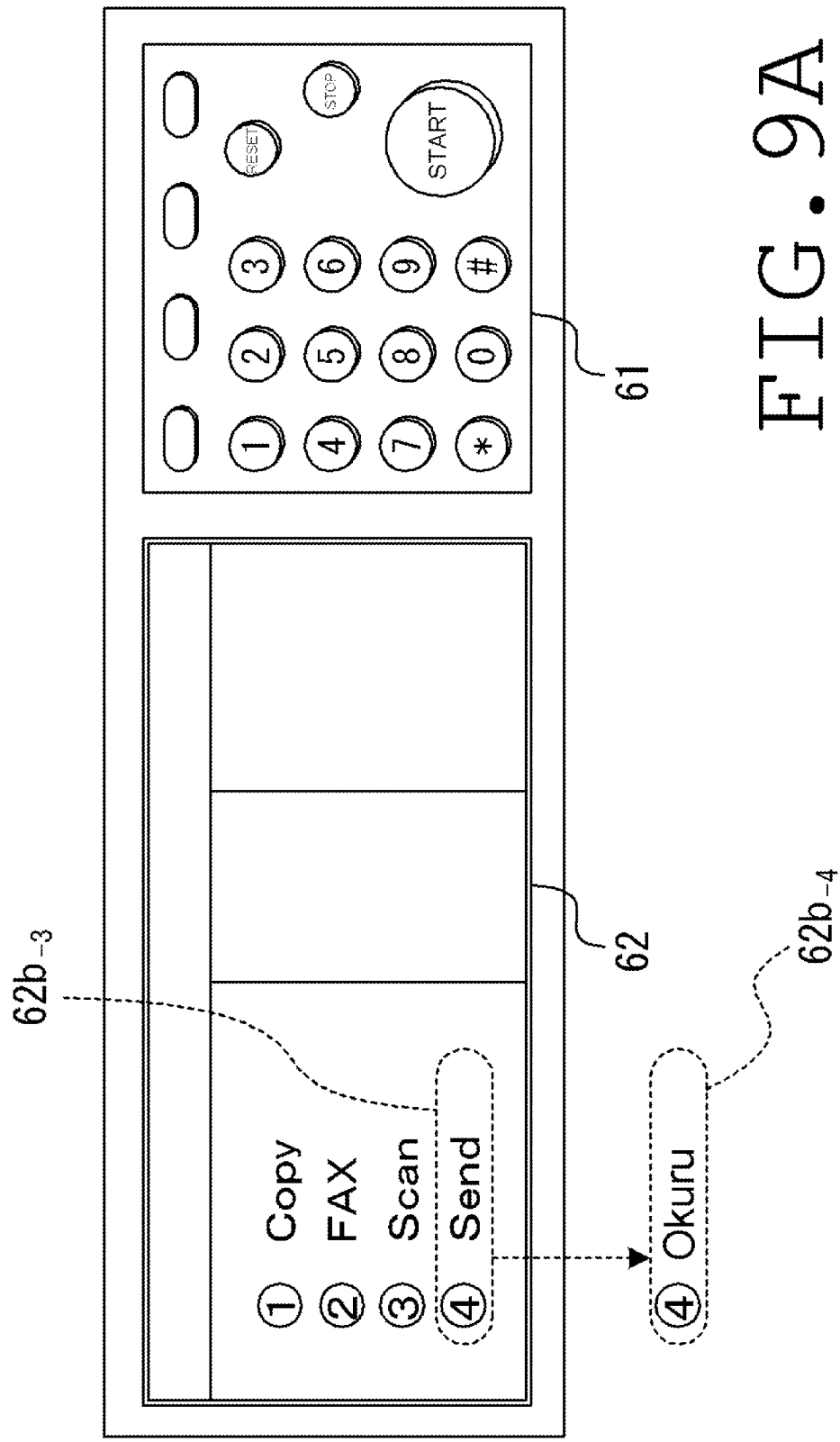
FIG. 9A is a diagram illustrating an example of the character string written in flash memory 101, or indication of liquid crystal display part 62, in cases where modification of a message that is judged not to be "appropriate" in the present embodiment is required.

Here, when verifying the validity of the character string received in above-mentioned Step 15, the example determined not to be appropriate is explained. FIG. 9A corresponds to FIG. 4B. In an example of FIG. 9A, from a user or the like, there is a request of the purport that replacing the notation "Send" of message 62*b*-3 of "(4)" to change into the notation of "Okuru" as like message 62*b*-4.

In case of changing the message shown on message 62*b*-3 of liquid crystal display part 62 based on a request as shown in FIG. 9A, the character string of "Okuru" is written in the address corresponding to [code] 4 in flash memory 101 as a [message] as shown in FIG. 9B.

However, according to the present embodiment, language 2 is chosen for a message as above-mentioned (referring to FIG. 6). Therefore, "Okuru" is not appropriate as a message replaced with "Send."

Control apparatus 9 has translation function and language translation table for verifying the validity and compatibility when changing a message. Therefore, in Step 15, control apparatus 9 determines that the character string sent from MET does not have validity (in this case, the language is different.) Then, control apparatus 9 answers the purport that this message is "not appropriate" and that reason to MFP 1 (Step 31).

As illustrated in FIG. 9C, the reason that is not appropriate is shown on the position of message 62*b*-5 on liquid crystal display part 62 (Step 32).

In this way, according to the embodiment of the present disclosure, in cases where it changes the message part shown on a liquid crystal display or the like, it is performed that the operation program including the message part is remade at a spot in which the MFP is installed. In addition, the check of the validity of the message part to be changed is possible. Therefore, a user request can be fulfilled promptly.

In detail, in a typical technology, to show a message in a different language on a liquid crystal display or the like, when updating a message part, an operation that a source of a program is remade and build is needed. Generally, a message in a different language that the translator is translated previously is used. However, sense of incongruity is shown at the place for the language, correction may be demanded from a user (or vendor in a place). Also in this case, since build was required, a user request was not able to be fulfilled promptly.

As compared with this, according to the present disclosure, at the place in which the MFP or the like are installed, the operation program including the message part can be remade, and the check of the validity of a message part to be changed is possible. Therefore, an effect is produced that the request of modification of the message from a user, or the like, can be fulfilled promptly.

It is clear that the present disclosure is not limited to each above-mentioned embodiment, but each embodiment may be suitably changed within the limits of the technology conception of the present disclosure.

For example, according to the above-mentioned embodiment, for modification of the message part, the character string is written in flash memory 101 connected to computer 10-2, this flash memory 101 is connected to MFP 1, and the character string is written in memory part 72. However, if it is connected to communications network 8 as like computer 10-1, it can be written in memory part 72 of MFP 1 via communications network 8 from computer 10-1.

Also, The above-mentioned embodiment shows an example that changes only one character string among the messages displayed on liquid crystal display part 62. However, two or more character strings may be changed, simultaneously.

In this case, control apparatus 9 determines validity for two or more character strings, simultaneously, and replies decision result, which may be intermingled "not appropriate" with "appropriate." In addition, CPU 71 may build a firmware that changes the message according to each of the decision result for the character string or may show the reason that is not appropriate on liquid crystal display part 62.

Further, by always rewriting firmware as such a process, record of the state of each MFP 1 remains in control apparatus 9.

What is claimed is:

1. An electronic apparatus, comprising:
a display that displays first information;
a memory part that is written the first information, second information and an operation program for changing a part or all of the first information to the second information, and a source code for a basis of the operation program;
a control circuit that executes a process based on the operation program; and
a communication interface that connects with a communications network to which a control apparatus is connected;
wherein the display displays the first information and the second information changed to from the first information, each corresponding to a function of the group consisting of a copy function, a fax function, a scanner function and a communication function;

wherein the operation program causes display of the second information in place of said changed all or part of the first information upon selection of a language in a language setting of the image forming apparatus; and
wherein the control circuit transmits the second information written in the memory part to the control apparatus and generates, only in a case where the second information is determined to be appropriate by the control apparatus, the operation program based on the source code, the first information, and the second information.

2. The electronic apparatus according to claim 1, further comprising:
an external interface the connects an external storage; and
the control circuit,
before transmitting the second information written in the memory part to the control apparatus, writes the second information written in the external storage to the memory part.

3. The electronic apparatus according to claim 1, wherein
a computer that transmits various information is connected to the communication interface, and
the control circuit,
before transmitting the second information written in the memory part to the control apparatus, writes the second information sent from the computer to the memory part.

4. The electronic apparatus according to claim 1, wherein
in cases where the second information is determined not to be appropriate by the control apparatus, the control circuit shows a reason being not appropriate on the display.

5. The electronic apparatus according to claim 1, wherein the control apparatus determines whether the second information is a correct meaning of the corresponding function, another language, or corresponding to a different function.

6. The electronic apparatus according to claim 5, wherein the control apparatus determines each of whether the second information is a correct meaning of the corresponding function, another language, and corresponding to a different function.

7. The electronic apparatus according to claim 5, wherein the control apparatus comprises a translation function for determining the language of the of the second information.

8. A controlling method of an electronic apparatus having
a display that displays first information,
a memory part that is written the first information, second information and an operation program for changing a part or all of the first information to the second information, and a source code for a basis of the operation program, and
a control circuit that executes a process based on the operation program, and
a communication interface that connects with a communications network to which a control apparatus is connected,
wherein the display displays the first information and the second information changed to from the first information, each corresponding to a function of the group consisting of a copy function, a fax function, a scanner function and a communication function,
wherein the operation program causes display of the second information in place of said changed all or part of the first information upon selection of a language in a language setting of the image forming apparatus, and
the method includes:

a first step for transmitting the second information written in the memory part to the control apparatus by the control circuit;

a second step for determining whether the second information is appropriate by the control apparatus; and a third step for generating the operation program based on the source code, the first information, and the second information, only in a case where the second information is determined to be appropriate by the control apparatus.

9. The controlling method of the electronic apparatus according to claim 8, further including the step of:

before the first step, writing the second information written in the external storage to the memory part.

10. The controlling method of the electronic apparatus according to claim 8, further including the step of:

before the first step, being written the second information in the memory part from an external computer via a communication interface.

11. The controlling method of the electronic apparatus according to claim 8, further including the step of:

in cases where the second information is determined not to be appropriate by the control apparatus, showing a reason being not appropriate on the display by the control circuit.

12. A non-transitory recording medium storing a program that performs a controlling method of an electronic apparatus executed by the electronic apparatus having a display that displays first information, a memory part that is written the first information, second information and an operation program for changing a part or all of the first information to the second information, and a source code for a basis of the operation program, and a control circuit that executes a process based on the operation program, and a communication interface that connects with a communications network to which a control apparatus is connected, wherein the display displays the first information and the second information changed to from the first information, each corresponding to a function of the group consisting of a copy function, a fax function, a scanner function and a communication function, wherein the operation program causes display of the second information in place of said changed all or part of the first information upon selection of a language in a language setting of the image forming apparatus, and the program includes:

a first step for transmitting the second information written in the memory part to the control apparatus by the control circuit;

a second step for determining whether the second information is appropriate by the control apparatus; and a third step for generating the operation program based on the source code, the first information, and the second information, only in a case where the second information is determined to be appropriate by the control apparatus.

* * * * *